(12) United States Patent
Barnes

(10) Patent No.: US 10,548,800 B1
(45) Date of Patent: Feb. 4, 2020

(54) EXOSKELETON PELVIC LINK HAVING HIP JOINT AND INGUINAL JOINT

(71) Applicant: Lockheed Martin Corporation, Bethesda, MD (US)

(72) Inventor: Gavin A. Barnes, Saint Cloud, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 15/181,934

(22) Filed: Jun. 14, 2016

Related U.S. Application Data

(60) Provisional application No. 62/181,506, filed on Jun. 18, 2015.

(51) Int. Cl.
*A61H 3/00* (2006.01)
*A61H 1/02* (2006.01)
(Continued)

(52) U.S. Cl.
CPC ............. *A61H 3/00* (2013.01); *A61H 1/0262* (2013.01); *A63B 21/0004* (2013.01);
(Continued)

(58) Field of Classification Search
CPC ...... A61H 1/0244; A61H 1/0262; A61H 3/00; A61H 2201/1652; A61H 2201/1642;
(Continued)

(56) References Cited

U.S. PATENT DOCUMENTS 2,010,482 A 8/1935 Cobb
3,964,182 A 6/1976 Pomeret et al.
(Continued)

FOREIGN PATENT DOCUMENTS

JP H03105191 U 10/1991
JP 3024978 U 6/1996
(Continued)

OTHER PUBLICATIONS

Artemiadis, Panagiotis K. et al., "EMG-based Position and Force Estimates in Coupled Human-Robot Systems: Towards EMG-controlled Exoskeletons," Experimental Robotics: The Eleventh International Symposium (book), vol. 54, 2009, Springer Berlin Heidelberg, pp. 1-10.
(Continued)

*Primary Examiner* — Tu A Vo
(74) *Attorney, Agent, or Firm* — Withrow & Terranova, PLLC

(57) ABSTRACT

An exoskeleton pelvic sub-assembly includes one or more pelvic links each having a hip sagittal rotation axis and an inguinal sagittal rotation axis different from the hip sagittal rotation axis. A hip joint is coupled to the pelvic link and is configured to be coupled to a hip link of the exoskeleton. The hip joint is configured to allow sagittal plane rotation of the pelvic link with respect to the hip link about the hip sagittal rotation axis. One or more inguinal joints are also coupled to the pelvic link, each configured to be coupled to a thigh link. The inguinal joint is configured to allow sagittal plane rotation of the pelvic link with respect to the thigh link about the inguinal sagittal rotation axis.

11 Claims, 11 Drawing Sheets

US 10,548,800 B1

Page 2

(51) Int. Cl.
   *A63B 21/00* (2006.01)
   *B25J 9/00* (2006.01)
(52) U.S. Cl.
   CPC ....... *A63B 21/00178* (2013.01); *B25J 9/0006* (2013.01); *A61H 2003/007* (2013.01); *A61H 2201/1215* (2013.01); *A61H 2201/1238* (2013.01); *A61H 2201/1628* (2013.01); *A61H 2201/1642* (2013.01); *A61H 2201/1652* (2013.01)
(58) Field of Classification Search
   CPC .... A61H 2201/1628; A61H 2201/1238; A61H 2003/007; A61H 2201/1215; A61F 2/605; B25J 9/0006; A63B 21/00178; A63B 21/0004
   See application file for complete search history.

(56) References Cited

U.S. PATENT DOCUMENTS

| | | | |
|---|---|---|---|
| 4,258,556 A | | 3/1981 | Ruyten et al. |
| 5,016,869 A | | 5/1991 | Dick et al. |
| 5,020,790 A | * | 6/1991 | Beard .................. A61F 5/0102 482/4 |
| 5,054,476 A | * | 10/1991 | Petrofsky ............. A61F 5/0102 482/51 |
| 5,476,441 A | * | 12/1995 | Durfee ................ A61F 5/0102 434/112 |
| 5,865,426 A | | 2/1999 | Kazerooni |
| 5,993,404 A | | 11/1999 | McNiel |
| 6,886,812 B2 | | 5/2005 | Kazerooni |
| 6,913,583 B2 | | 7/2005 | Jestrabek-Hart |
| 7,153,242 B2 | | 12/2006 | Goffer |
| 7,163,518 B1 | | 1/2007 | Roche et al. |
| 7,571,839 B2 | | 8/2009 | Chu et al. |
| 7,628,766 B1 | | 12/2009 | Kazerooni et al. |
| 7,883,546 B2 | | 2/2011 | Kazerooni et al. |
| 7,947,004 B2 | | 5/2011 | Kazerooni et al. |
| 8,057,410 B2 | | 11/2011 | Angold et al. |
| 8,070,700 B2 | | 12/2011 | Kazerooni et al. |
| 8,171,570 B2 | | 5/2012 | Adarraga |
| 8,231,688 B2 | | 7/2012 | Fairbanks et al. |
| 8,257,291 B2 | | 9/2012 | Kazerooni et al. |
| 8,394,038 B2 | | 3/2013 | Ashihara et al. |
| 8,672,865 B2 | | 3/2014 | Franke et al. |
| 8,702,632 B2 | | 4/2014 | Han et al. |
| 8,801,641 B2 | | 8/2014 | Kazerooni et al. |
| 8,894,592 B2 | | 11/2014 | Amundson et al. |
| 8,945,028 B2 | | 2/2015 | Kazerooni et al. |
| 8,968,222 B2 | | 3/2015 | Kazerooni et al. |
| 9,011,354 B2 | | 4/2015 | Angold et al. |
| 9,333,644 B2 | | 5/2016 | Angold |
| 9,492,300 B2 | | 11/2016 | Bujold et al. |
| 9,662,262 B2 | | 5/2017 | Hollander et al. |
| 2003/0062241 A1 | | 4/2003 | Irby et al. |
| 2003/0073552 A1 | | 4/2003 | Knight |
| 2003/0093018 A1 | | 5/2003 | Albrecht et al. |
| 2003/0109817 A1 | | 6/2003 | Berl |
| 2003/0115954 A1 | | 6/2003 | Zemlyakov et al. |
| 2004/0237351 A1 | | 12/2004 | Howell |
| 2005/0137717 A1 | | 6/2005 | Gramnas et al. |
| 2006/0064047 A1 | | 3/2006 | Shimada et al. |
| 2006/0107433 A1 | | 5/2006 | Olson |
| 2006/0260620 A1 | | 11/2006 | Kazerooni et al. |
| 2007/0056592 A1 | | 3/2007 | Angold et al. |
| 2007/0123997 A1 | | 5/2007 | Herr et al. |
| 2007/0233279 A1 | | 10/2007 | Kazerooni et al. |
| 2008/0234608 A1 | | 9/2008 | Sankai |
| 2009/0210093 A1 | | 8/2009 | Jacobsen et al. |
| 2009/0292369 A1 | | 11/2009 | Kazerooni et al. |
| 2010/0076360 A1 | | 3/2010 | Shimada et al. |
| 2010/0094185 A1 | | 4/2010 | Amundson et al. |
| 2010/0152630 A1 | | 6/2010 | Matsuoka et al. |
| 2010/0210980 A1 | | 8/2010 | Kudoh |
| 2010/0254696 A1 | | 10/2010 | McKay |
| 2010/0324699 A1 | | 12/2010 | Herr et al. |
| 2011/0040216 A1 | | 2/2011 | Herr et al. |
| 2011/0105966 A1 | | 5/2011 | Kazerooni et al. |
| 2011/0166489 A1 | | 7/2011 | Angold et al. |
| 2011/0201978 A1 | * | 8/2011 | Jeon .................. A61G 5/045 601/35 |
| 2011/0214524 A1 | | 9/2011 | Jacobsen et al. |
| 2011/0264014 A1 | | 10/2011 | Angold |
| 2011/0266323 A1 | | 11/2011 | Kazerooni et al. |
| 2012/0004736 A1 | | 1/2012 | Goldfarb et al. |
| 2012/0073165 A1 | | 3/2012 | McKeown |
| 2012/0172770 A1 | | 7/2012 | Almesfer et al. |
| 2012/0192461 A1 | | 8/2012 | Backus |
| 2012/0283845 A1 | | 11/2012 | Herr et al. |
| 2012/0292361 A1 | | 11/2012 | Thiruppathi |
| 2013/0023800 A1 | | 1/2013 | Bédard et al. |
| 2013/0102935 A1 | | 4/2013 | Kazerooni et al. |
| 2013/0150980 A1 | | 6/2013 | Swift et al. |
| 2013/0197408 A1 | | 8/2013 | Goldfarb et al. |
| 2013/0231595 A1 | | 9/2013 | Zoss et al. |
| 2013/0237884 A1 | | 9/2013 | Kazerooni et al. |
| 2013/0296746 A1 | | 11/2013 | Herr et al. |
| 2013/0303950 A1 | | 11/2013 | Angold et al. |
| 2013/0331744 A1 | * | 12/2013 | Kamon ................ A61H 3/00 601/35 |
| 2014/0001222 A1 | | 1/2014 | Vierthaler et al. |
| 2014/0046234 A1 | | 2/2014 | DeSousa |
| 2014/0094729 A1 | * | 4/2014 | Lachance .............. A61F 5/01 602/16 |
| 2014/0200491 A1 | | 7/2014 | Julin et al. |
| 2014/0207017 A1 | | 7/2014 | Gilmore et al. |
| 2014/0276264 A1 | | 9/2014 | Caires et al. |
| 2014/0330431 A1 | | 11/2014 | Hollander et al. |
| 2014/0358053 A1 | | 12/2014 | Triolo et al. |
| 2015/0001269 A1 | | 1/2015 | Sacksteder |
| 2015/0081036 A1 | | 3/2015 | Nakanishi et al. |
| 2015/0134080 A1 | | 5/2015 | Roh |
| 2015/0173992 A1 | | 6/2015 | Wang |
| 2015/0272501 A1 | | 10/2015 | MacEachern et al. |
| 2015/0272809 A1 | * | 10/2015 | Accoto ............... A61H 1/0237 623/31 |
| 2015/0313786 A1 | | 11/2015 | Sano |
| 2015/0321340 A1 | * | 11/2015 | Smith ................. B25J 9/10 74/490.01 |
| 2015/0366694 A1 | | 12/2015 | Bujold et al. |
| 2016/0015589 A1 | | 1/2016 | Lee et al. |
| 2016/0016307 A1 | | 1/2016 | Choi et al. |
| 2016/0038313 A1 | | 2/2016 | Kim et al. |
| 2016/0038371 A1 | | 2/2016 | Sandler et al. |
| 2016/0058647 A1 | | 3/2016 | Maddry |
| 2016/0067550 A1 | | 3/2016 | Breach et al. |
| 2016/0184165 A1 | | 6/2016 | Ohta et al. |
| 2016/0262969 A1 | | 9/2016 | Ohta et al. |
| 2017/0014297 A1 | | 1/2017 | Grygorowicz et al. |
| 2017/0061828 A1 | | 3/2017 | Artemiadis et al. |
| 2017/0181917 A1 | | 6/2017 | Ohta et al. |
| 2017/0303849 A1 | | 10/2017 | De Sapio et al. |

FOREIGN PATENT DOCUMENTS

| | | |
|---|---|---|
| JP | 2003104682 A | 4/2003 |
| JP | 200911818 A | 1/2009 |
| KR | 101570679 B1 | 11/2015 |
| WO | 2012154580 A1 | 11/2012 |
| WO | 2013116900 A1 | 8/2013 |
| WO | 2014125387 A2 | 8/2014 |
| WO | 2014159608 A1 | 10/2014 |
| WO | 2016029159 A2 | 2/2016 |
| WO | 2017025363 A1 | 2/2017 |

OTHER PUBLICATIONS

Ferris, Daniel P. et al., "An Ankle-Foot Orthosis Powered by Artificial Muscles," Journal of Applied Biomechanics, vol. 21, Issue 2, May 2005, Human Kinetics, Inc., 3 pages.

(56) References Cited

OTHER PUBLICATIONS

Ferris, Dan et al., "An Improved Ankle-Foot Orthosis Powered by Artificial Pneumatic Muscles," XIXth Congress of the International Society of Biomechanics: the human body in motion, Jul. 6-11, 2003, Dunedin, New Zealand, University of Otago, 17 pages.

Ferris, Daniel P. et al., "Development of a myoelectrically controlled lower limb orthosis for human locomotion," Proceedings of the NCMRR Symposium "Medical Rehab on the Move: Spotlight on BioEngineering," Abstract, Jan. 4-5, 2001, Bethesda, Maryland, Supported by NIH AR08602 and U.S. Dept. of Veterans Affairs Center Grant #A0806C, 2 pages.

Gordon, Keith E. et al., "Motor Adaptation During Walking with a Powered Ankle Foot Orthosis," Journal of NeuroEngineering and Rehabilitation, vol. 4, 2007, BioMed Central Ltd, 2 pages.

Kawamoto, Hiroaki et al., "Power Assist Method for HAL-3 using EMG-based Feedback Controller," IEEE International Conference on Systems, Man and Cybernetics, Oct. 8, 2003, IEEE, pp. 1648-1653.

Sawicki, Gregory S. et al., "A Knee-Ankle-Foot Orthosis (KAFO) Powered by Artificial Pneumatic Muscles," XIXth Congress of the International Society of Biomechanics: the human body in motion, Jul. 6-11, 2003, Dunedin, New Zealand, 1 page.

Sawicki, Gregory S. et al., "Mechanics and energetics of level walking with powered ankle exoskeletons," The Journal of Experimental Biology, vol. 211, Feb. 19, 2009, The Company of Biologists, pp. 1402-1413.

Non-Final Office Action and Examiner-Initiated Interview Summary for U.S. Appl. No. 14/744,892, dated Feb. 17, 2017, 44 pages.

Notice of Allowance and Notice Requiring Inventor's Oath or Declaration for U.S. Appl. No. 14/744,892, dated Jul. 5, 2017, 11 pages.

Corrected Notice of Allowance for U.S. Appl. No. 14/744,892, dated Jul. 14, 2017, 7 pages.

Whitwam, Ryan, et al., "Banks now have money-grabbing robotic exoskeletons that are probably helpful for robbing banks," PCMag Digital Group, May 9, 2015, Ziff Davis, LLC, www.geek.com/?s=japanese+banks+now+have+money+grabbing&x=0&y=0, 4 pages.

Non-Final Office Action for U.S. Appl. No. 13/084,265, dated Sep. 10, 2015, 7 pages.

Extended European Search Report for European Patent Application No. 11766862.4, dated May 27, 2014, 4 pages.

Notice of Reasons for Refusal for Japanese Patent Application No. 2013-504019, dated Feb. 24, 2015, 6 pages.

International Search Report for PCT/US2011/031956, dated Jun. 21, 2011, 2 pages.

International Preliminary Report on Patentability for PCT/US2011/031956, dated Oct. 9, 2012, 6 pages.

Supplemental Notice of Allowability for U.S. Appl. No. 13/084,265, dated Jan. 25, 2016, 3 pages.

Notice of Reasons for Refusal for Japanese Patent Application No. 2013-504019, dated Dec. 22, 2015, 6 pages.

Decision to Grant for Japanese Patent Application No. 2013-504019, dated Aug. 16, 2016, 6 pages.

International Search Report and Written Opinion for International Patent Application No. PCT/US2016/042427, dated Oct. 24, 2016, 18 pages.

International Preliminary Report on Patentability for PCT/US2016/042427, dated Jan. 23, 2018, 13 pages.

International Search Report and Written Opinion for International Patent Application No. PCT/US2018/032940, dated Sep. 12, 2018, 17 pages.

Notice of Allowance for U.S. Appl. No. 14/801,941, dated Sep. 19, 2018, 8 pages.

Notice of Allowance for U.S. Appl. No. 15/371,709, dated Jul. 13, 2018, 10 pages.

Non-Final Office Action for U.S. Appl. No. 14/801,941, dated Apr. 25, 2018, 9 pages.

Non-Final Office Action for U.S. Appl. No. 15/359,806, dated Nov. 16, 2018, 12 pages.

Partial Supplementary European Search Report for European Patent Application No. 16828290.3, dated Mar. 1, 2019, 12 pages.

International Search Report and Written Opinion for International Patent Application No. PCT/US2018/048517, dated Dec. 31, 2018, 13 pages.

Written Opinion for Singaporean Patent Application No. 11201800019U, dated Mar. 12, 2019, 7 pages.

Non-Final Office Action for U.S. Appl. No. 15/597,213, dated Apr. 30, 2019, 10 pages.

Non-Final Office Action for U.S. Appl. No. 14/744,855, dated Apr. 25, 2019, 9 pages.

Final Office Action for U.S. Appl. No. 15/359,806, dated May 31, 2019, 14 pages.

Extended European Search Report for European Patent Application No. 16828290.3, dated Aug. 14, 2019, 11 pages.

Author Unknown, "Definition of avoid," Merriam-Webster Dictionary, 2019, accessed online from https://www.merriam-webster.com/dictionary/avoid, Merriam-Webster, Inc., 4 pages.

Notice of Allowance for U.S. Appl. No. 15/597,213, dated Aug. 15, 2019, 7 pages.

Final Office Action for U.S. Appl. No. 14/744,855, dated Aug. 13, 2019, 9 pages.

Notice of Allowance and AFCP 2.0 Decision for U.S. Appl. No. 14/744,855, dated Oct. 9, 2019, 9 pages.

* cited by examiner

EXOSKELETON PELVIC LINK HAVING HIP JOINT AND INGUINAL JOINT

PRIORITY APPLICATION

This application claims the benefit of U.S. provisional patent application No. 62/181,506, filed Jun. 18, 2015, entitled "EXOSKELETON PELVIC SEGMENT AND LOWER BODY EXOSKELETON THAT INCLUDES A PELVIC SEGMENT," the disclosure of which is incorporated herein by reference in its entirety.

TECHNICAL FIELD

Embodiments relate generally to exoskeletons, and in particular to an exoskeleton pelvic link having a hip joint and an inguinal joint.

BACKGROUND

Conventional exoskeleton designs have a lower body exoskeleton rotatably coupled to an upper body exoskeleton via a hip rotation axis, which permits a user's legs and upper body to rotate with respect to each other. Conventional lower body exoskeleton designs typically employ a two-link architecture that includes a first thigh from the hip rotation axis to each of the user's knees and a second calf link from each knee to the ground. Such exoskeleton designs are typically utilized in walking applications and, although of limited mobility, are generally sufficient for such walking applications. However, such exoskeleton designs impede natural movements that involve a user moving their body in more complex movements outside of a walking range of motion, including, for example, squatting, kneeling, running, and the like.

SUMMARY

Embodiments relate generally to exoskeletons, and in particular to an exoskeleton pelvic link having a hip joint and an inguinal joint. In one embodiment, an exoskeleton pelvic sub-assembly includes one or more pelvic links each having a hip sagittal rotation axis and an inguinal sagittal rotation axis different from the hip sagittal rotation axis. A hip joint is coupled to the pelvic link and is configured to be coupled to a hip link of the exoskeleton. The hip joint is configured to allow sagittal plane rotation of the pelvic link with respect to the hip link about the hip sagittal rotation axis, for example to allow sagittal rotation of the upper body exoskeleton with respect to the pelvic link. One or more inguinal joints are also coupled to the pelvic link, each configured to be coupled to a thigh link. The inguinal joint is configured to allow sagittal plane rotation of the pelvic link with respect to the thigh link about the inguinal sagittal rotation axis, for example to allow sagittal rotation of each thigh link with respect to the pelvic link. One advantage of this arrangement is that the upper body exoskeleton and the thigh links can rotate about the pelvic link at different sagittal rotation axes and at different rates. This in turn allows the pelvic link to conform more naturally to the movement of a human user when performing complex movements, such as squatting, kneeling, running, and the like.

In one embodiment, an exoskeleton pelvic sub-assembly is disclosed. The exoskeleton pelvic sub-assembly comprises a pelvic link having a hip sagittal rotation axis and an inguinal sagittal rotation axis different from the hip sagittal rotation axis. The exoskeleton pelvic sub-assembly further comprises a hip joint coupled to the pelvic link. The hip joint is configured to be coupled to a hip link and to allow sagittal plane rotation of the pelvic link with respect to the hip link about the hip sagittal rotation axis. The exoskeleton pelvic sub-assembly further comprises an inguinal joint coupled to the pelvic link. The inguinal joint is configured to be coupled to a thigh link and to allow sagittal plane rotation of the pelvic link with respect to the thigh link about the inguinal sagittal rotation axis.

In another embodiment, a lower body exoskeleton is disclosed. The lower body exoskeleton comprises a pelvic link having a hip sagittal rotation axis and an inguinal sagittal rotation axis different from the hip sagittal rotation axis. The lower body exoskeleton further comprises a hip joint coupled to the pelvic link. The hip joint is configured to be coupled to a hip link of an upper body exoskeleton and to allow sagittal plane rotation of the pelvic link about the hip sagittal rotation axis. The lower body exoskeleton further comprises a thigh link. The lower body exoskeleton further comprises an inguinal joint coupled to the pelvic link and to the thigh link. The inguinal joint is configured to allow sagittal plane rotation of the pelvic link about the inguinal sagittal rotation axis. The lower body exoskeleton further comprises a calf link. The lower body exoskeleton further comprises a knee joint coupled to the thigh link and the calf link, the knee joint configured to allow sagittal plane rotation of the calf link.

In another embodiment, a method of using a lower body exoskeleton is disclosed. The method comprises rotating a hip link of the exoskeleton in a first sagittal plane about a hip sagittal rotation axis of a pelvic link. The method further comprises rotating a thigh link of the exoskeleton in a second sagittal plane parallel to the first sagittal plane about an inguinal sagittal rotation axis of the pelvic link. The inguinal sagittal rotation axis is different from the hip sagittal rotation axis.

Those skilled in the art will appreciate the scope of the disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The use herein of ordinals in conjunction with an element is solely for distinguishing what might otherwise be similar or identical labels, such as "first link" and "second link," and does not imply a priority, a type, an importance, or other attribute, unless otherwise stated herein.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first tube set" and "second tube set," and does not imply a priority, a type, an importance, or other attribute, unless otherwise stated herein. The term "about" used herein in conjunction with a numeric value means any value that is within a range of ten percent greater than or ten percent less than the numeric value.

Embodiments relate generally to exoskeletons, and in particular to an exoskeleton pelvic link having a hip joint and an inguinal joint. In one embodiment, an exoskeleton pelvic sub-assembly includes one or more pelvic links each having a hip sagittal rotation axis and an inguinal sagittal rotation axis different from the hip sagittal rotation axis. A hip joint is coupled to the pelvic link and is configured to be coupled to a hip link of the exoskeleton. The hip joint is configured to allow sagittal plane rotation of the pelvic link with respect to the hip link about the hip sagittal rotation axis, for example to allow sagittal rotation of the upper body exoskeleton with respect to the pelvic link. One or more inguinal joints are also coupled to the pelvic link, each configured to be coupled to a thigh link. The inguinal joint is configured to allow sagittal plane rotation of the pelvic link with respect to the thigh link about the inguinal sagittal rotation axis, for example to allow sagittal rotation of each thigh link with respect to the pelvic link. One advantage of this arrangement is that the upper body exoskeleton and the thigh links can rotate about the pelvic link at different sagittal rotation axes and at different rates. This in turn allows the pelvic link to conform more naturally to the movement of a human user when performing complex movements, such as squatting, kneeling, running, and the like.

Figure 1:
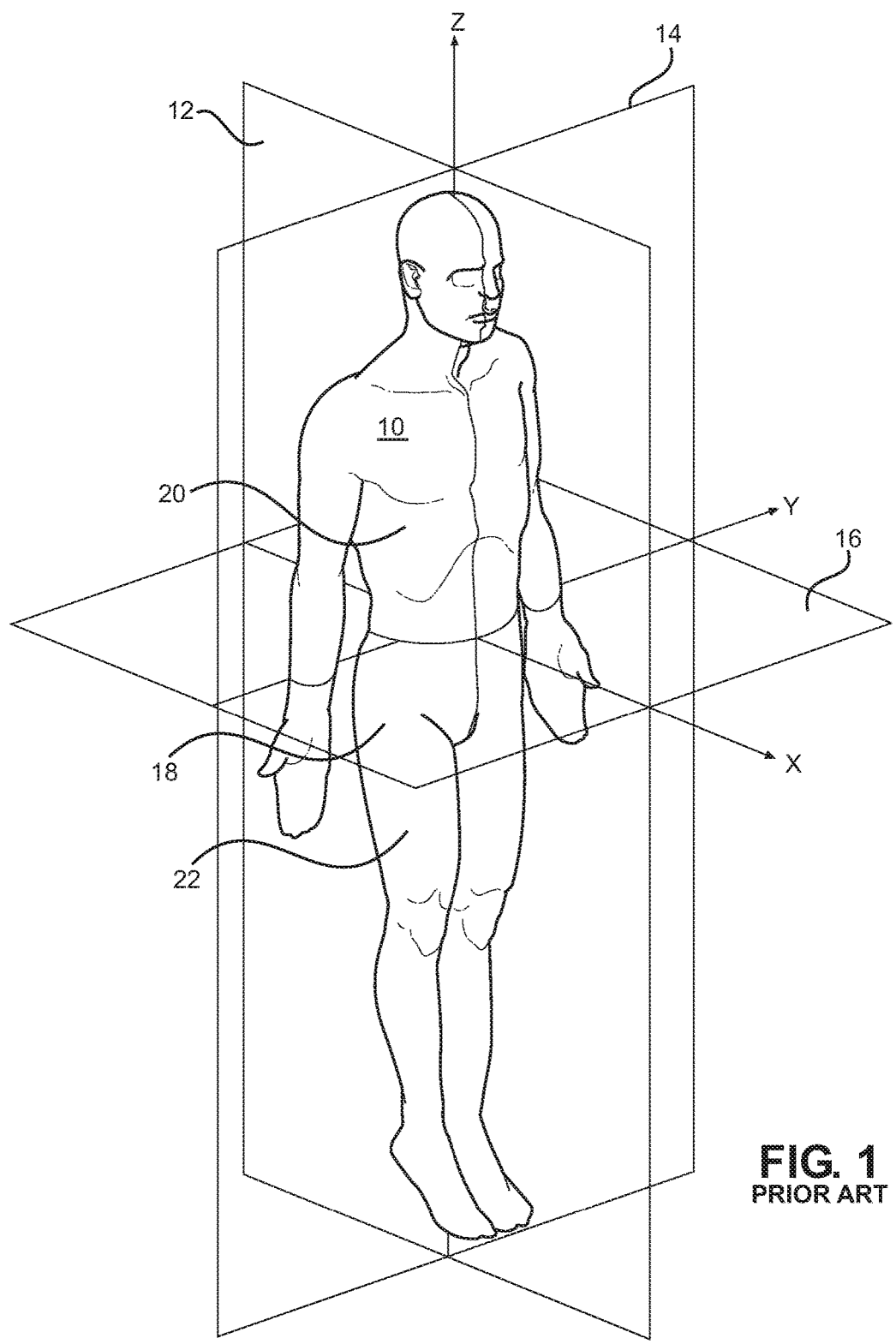
FIG. 1 is a reference diagram illustrating various planes of rotation with respect to a human user, as is known in the art.

In this regard, FIG. 1 is a reference diagram of a body 10 of a human user illustrating three primary planes of movement, as is known in the art. As used herein, a sagittal plane 12 is coplanar with the X axis and the Z axis, defining a plane that vertically divides the body 10 in right and left halves. Sagittal rotation or sagittal plane rotation, as used herein, refers to a rotation of an exoskeleton link about an axis such that an arc of the rotated link is substantially parallel with the sagittal plane 12. Sagittal plane rotation typically occurs about an axis that is perpendicular to the sagittal plane 12, i.e., an axis parallel to the Y axis in this example.

A frontal plane 14 is illustrated as a plane that is coplanar with the Y axis and the Z axis, vertically dividing the body 10 of the human user in front and back halves. Frontal plane rotation, as used herein, refers to a rotation of an exoskeleton link about an axis such that an arc of the rotated link is substantially parallel with the frontal plane 14. Frontal plane rotation typically occurs about an axis that is perpendicular to the frontal plane 14, i.e., an axis parallel to the X axis.

A transverse plane 16 is illustrated as a plane that is coplanar with the X axis and Y axis, horizontally dividing the body 10 in top and bottom halves. Transverse plane rotation, as used herein, refers to a rotation of an exoskeleton link about an axis such that an arc of the rotated link is substantially parallel with the transverse plane 16. Transverse plane rotation typically occurs about an axis that is perpendicular to the transverse plane 16, i.e., an axis parallel to the Z axis.

In a normal human body 10, a pelvis 18 allows rotation of an upper body 20 of the human user with 3 degrees of freedom, i.e., about the sagittal plane 12, the frontal plane 14, and the transverse plane 16. Similarly, the pelvis 18 also allows each thigh 22 to also rotate with respect to the pelvis 18 with 3 degrees of freedom. A two-link architecture using only sagittal rotation may be sufficient for a lower body exoskeleton to perform most walking applications, because most walking applications require minimal movement of the pelvis 18 with respect to the upper body 20, and can be accomplished without frontal rotation and/or transverse rotation. However, other more complex movements, such as squatting, kneeling, running, and the like, are more difficult to accomplish using a two-link architecture, and without additional frontal rotation and/or transverse rotation components. Accordingly, there was a need for an exoskeleton that is capable of conforming to the different types of rotation of the pelvis 18, upper body 20, thighs 22, and/or other articulable parts of the body 10.

Figure 2A:
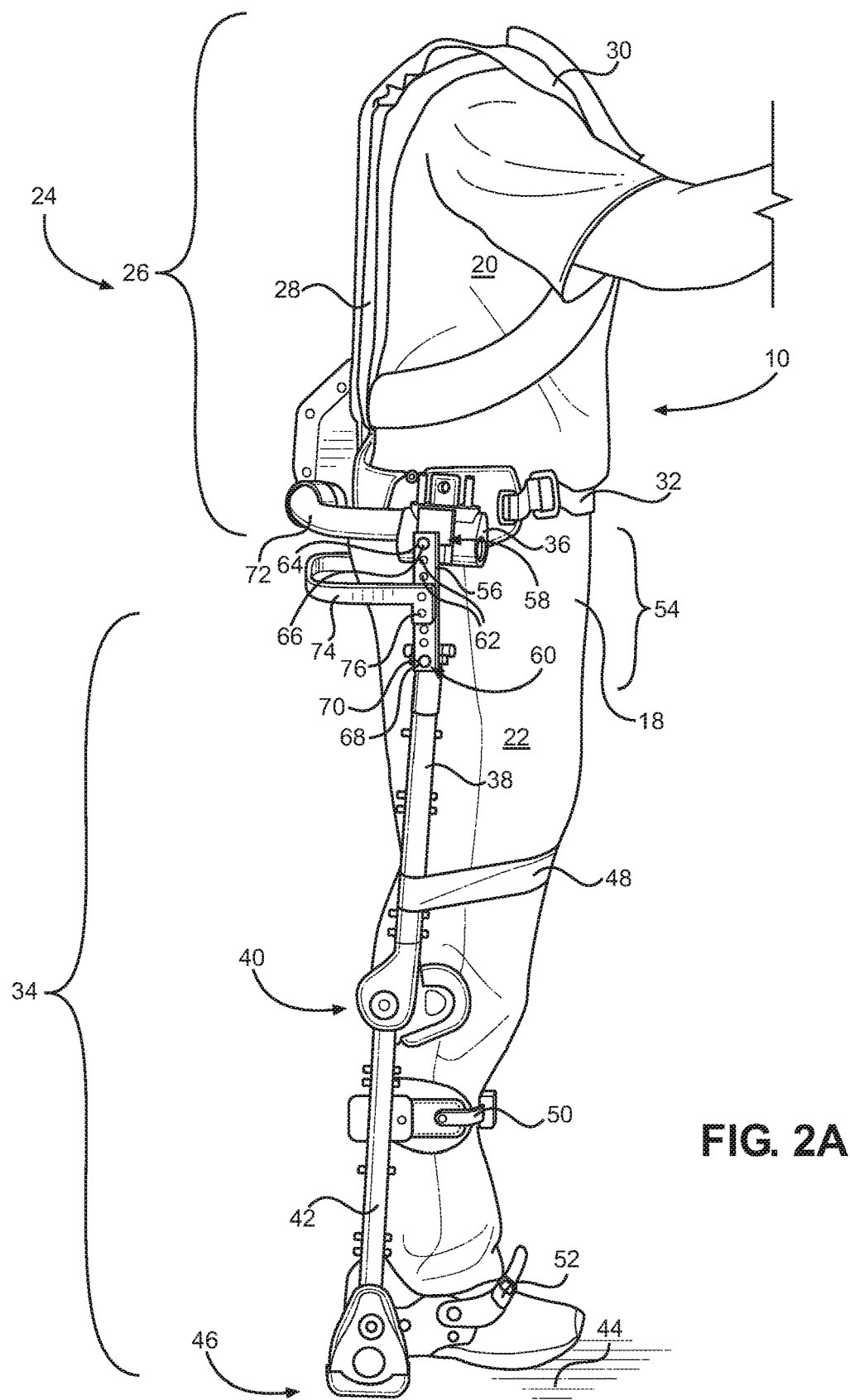
FIGS. 2A and 2B are diagrams illustrating use of a lower body exoskeleton by a user in a standing position and a squatting position, according to an embodiment.
Figure 2B:
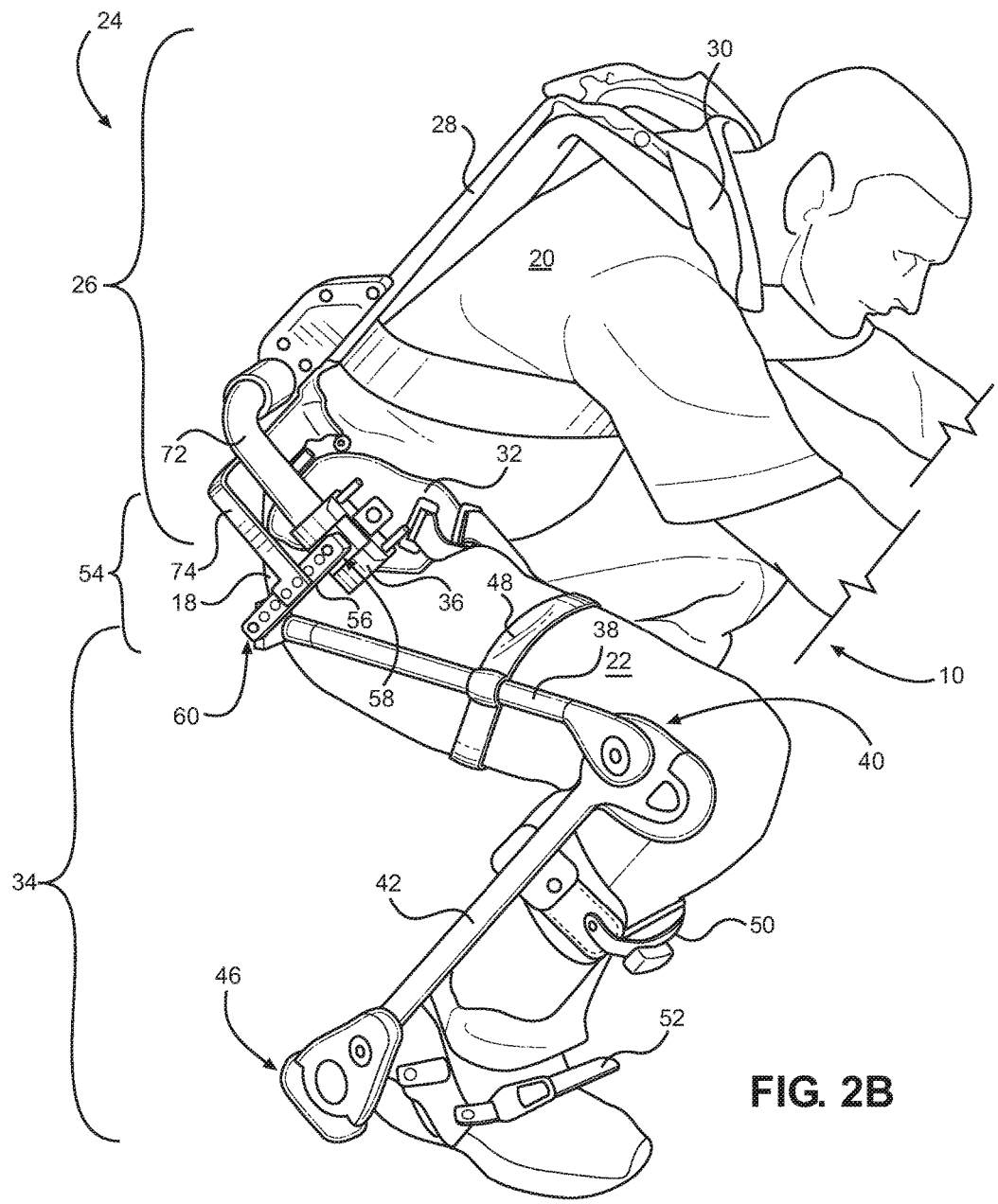

In this regard, FIGS. 2A and 2B illustrate an exoskeleton 24 being worn by the body 10 of the human user. The exoskeleton 24 includes an upper body exoskeleton 26 having a back plate 28, with shoulder straps 30 and belt straps 32 for securing the upper body exoskeleton 26 to the upper body 20 of the human user. The exoskeleton 24 also includes a lower body exoskeleton 34 coupled to the upper body exoskeleton 26 via a hip link 36. A thigh link 38 is rotatably coupled to the hip link 36, and a knee joint 40 rotatably couples the thigh link 38 to a calf link 42. Each calf link 42 is supported on a floor 44 or other support surface via a rocker 46 or other support structure. For example, in some embodiments, the rocker 46 comprises a foot link, which is positioned under a foot of the user. A plurality of thigh straps 48, calf straps 50, and/or foot straps 52 are configured to secure the lower body exoskeleton 34 to the thighs 22 and lower legs of the body 10.

In this embodiment, an exoskeleton pelvic sub-assembly 54 is coupled between the hip link 36 and each thigh link 38. The pelvic sub-assembly 54 includes a pelvic link 56 having a hip sagittal rotation axis 58 that is perpendicular to the sagittal plane 12 and an inguinal sagittal rotation axis 60 that is also perpendicular to the sagittal plane 12. In this embodiment, the inguinal sagittal rotation axis 60 is different from the hip sagittal rotation axis 58, which allows the pelvic sub-assembly 54 to provide two independent points of rotation with respect to each thigh link 38, which in turn allows the pelvic sub-assembly 54 to more accurately mimic and conform to the natural movement and rotation of the pelvis 18 of the human user during normal activity. For example, as shown in FIG. 2B, the pelvic sub-assembly 54 is particularly well suited for applications that require the body 10 to squat, bend over, or otherwise engage in activity that is difficult to perform with conventional two-link lower body exoskeletons. As further shown in FIG. 2B, the pelvic sub-assembly also allows independent three-dimensional rotation of the thighs 22 and/or the upper body 20 of the human user wearing the exoskeleton 24, which further allows the lower body exoskeleton 34 to more closely conform to a greater variety of natural human movements.

Figure 3:
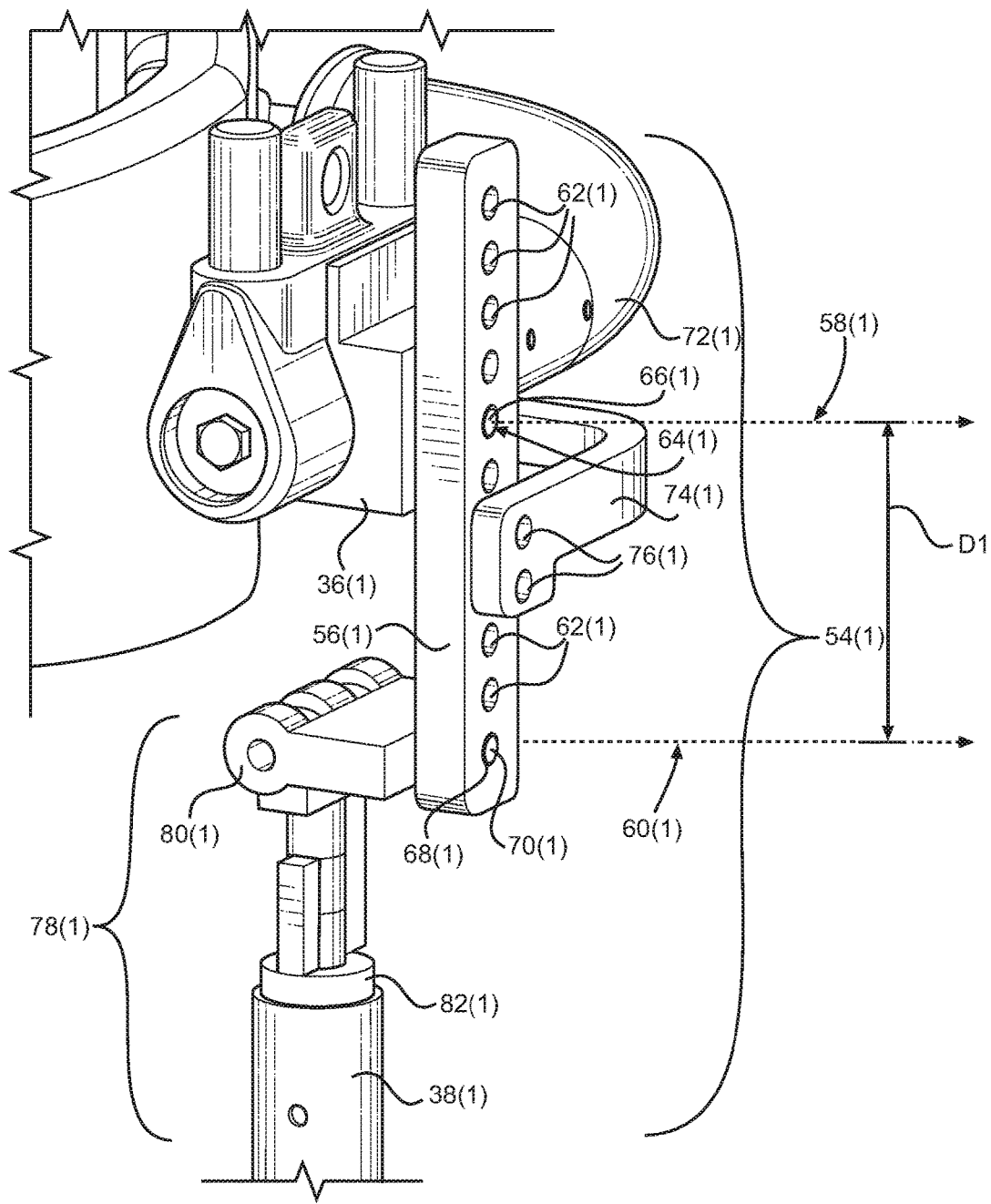
FIG. 3 is a detailed isometric diagram of an exoskeleton pelvic sub-assembly suitable for use with the lower body exoskeleton of FIGS. 2A and 2B, according to an embodiment.

In this embodiment, a hip joint 64 is coupled between the pelvic link 56 and the hip link 36 via a hip joint fastener 66 (hip joint fastener 66(1) in FIG. 3), and is configured to allow sagittal plane rotation of the pelvic link 56 with respect to the hip link 36 about the hip sagittal rotation axis 58. An inguinal joint 68 is also coupled between the pelvic link 56 and the thigh link 38 via an inguinal joint fastener 70, and is configured to allow sagittal plane rotation of the pelvic link 56 with respect to the thigh link 38 about the inguinal sagittal rotation axis 60. One advantage of this arrangement is that this conforms to the natural independent rotation of the pelvis 18 with respect to the upper body 20 and thighs 22 of the body 10. For example, the upper body 20 rotates with respect to the pelvis 18 via a junction between the pelvis 18 and one or more lumbar vertebrae (not shown), while each thigh 22 rotates with respect to the pelvis 18 via a ball and socket joint (not shown) within the pelvis 18 at a different location in the sagittal plane 12 from the junction between lumbar vertebrae and the pelvis 18. As a result, during a complex movement of the pelvis 18, such as a squat, the upper body 20 and the thighs 22 rotate with respect to the pelvis 18 at different locations within the sagittal plane 12 and about different sagittal rotation axes 58, 60. As a result, the independent hip joint 64 and inguinal joint 68 for each pelvic link 56 allow the exoskeleton 24 to better conform to the movements of the body 10 during complex movements.

In this embodiment, each pelvic link 56 is configured to allow independent sagittal plane rotation of a respective thigh link 38 with respect to the pelvic link 56 about the respective inguinal sagittal rotation axis 60 of the pelvic link 56. In this embodiment, however, the pair of pelvic links 56 is also configured to allow sagittal plane rotation of the pelvic links 56 about a common sagittal rotation axis comprising both hip sagittal rotation axes 58. This is accomplished using a hip arc member 72 coupled to the upper body exoskeleton 26 and each of the hip links 36. At the same time, a pelvic arc member 74 is coupled between the opposite pelvic links 56, via one or more pelvic arc fasteners 76 (pelvic arc fasteners 76(1) in FIG. 3), for example, to fix the pair of pelvic links 56 with respect to each other. This causes the pelvic links 56 to rotate together with respect to the hip links 36, while allowing each thigh link 38 to rotate independently with respect to each pelvic link 56.

Referring now to FIG. 3, a detailed view of a pelvic sub-assembly 54(1) is illustrated according to one embodiment. As discussed above, in this embodiment, the pelvic link 56(1) has a plurality of apertures 62(1) (aperture 62 in FIG. 2A) arranged linearly along the length of the pelvic link 56(1). This allows the pelvic link 56(1) to be rotatably secured to the hip link 36(1) and thigh link 38(1) using different apertures 62(1), thereby allowing the distance D1 between the hip link 36(1) (hip link 36(2) in FIG. 5) and the thigh link 38(1) to be adjustable in order to conform to the requirements of the body 10 of an individual human user, for example. In this embodiment, for example, the inguinal sagittal rotation axis 60(1) and the hip sagittal rotation axis 58(1) are each movable between a plurality of positions, i.e., apertures 62(1) (aperture 62(2) in FIG. 5), on the pelvic link 56(1) so that the inguinal sagittal rotation axis 60(1) and the hip sagittal rotation axis 58(1) can be separated by a distance D1 in the range of about 3 inches and about 6 inches in this example.

As can also be seen in FIG. 3, a thigh rotation joint 78(1) is disposed between the pelvic link 56(1) and the thigh link 38(1). The thigh rotation joint 78(1) includes an additional frontal rotation axis 80(1), which allows rotation along a transverse rotation axis 82(1) of the thigh link 38(1) in the transverse plane 16 and the frontal plane 14, in addition to the sagittal plane 12. This allows the connection between the thigh link 38(1) and the pelvic sub-assembly 54(1) to more closely conform to the natural ball and socket movement of the thigh 22 with respect to the pelvis 18 of the human user. Meanwhile, in this embodiment, the hip joint 64(1) is configured to allow only sagittal plane rotation of the pelvic link 56(1) about the hip sagittal rotation axis 58(1) (hip sagittal rotation axis 58(2) in FIG. 5).

Figure 4:
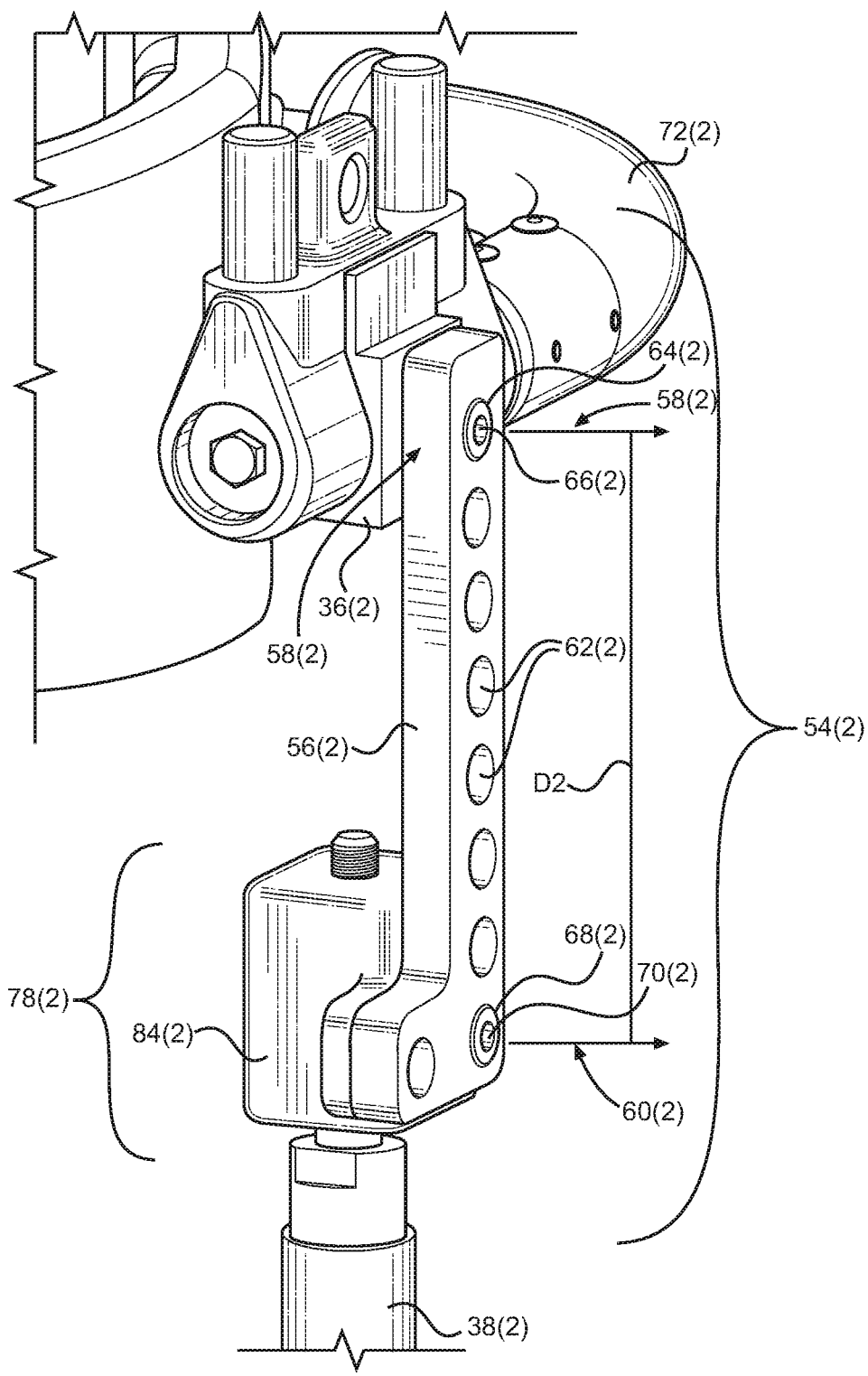
FIG. 4 is a detailed isometric diagram of an exoskeleton pelvic sub-assembly suitable for use with the lower body exoskeleton of FIGS. 2A and 2B, according to an alternate embodiment.
Figure 5:
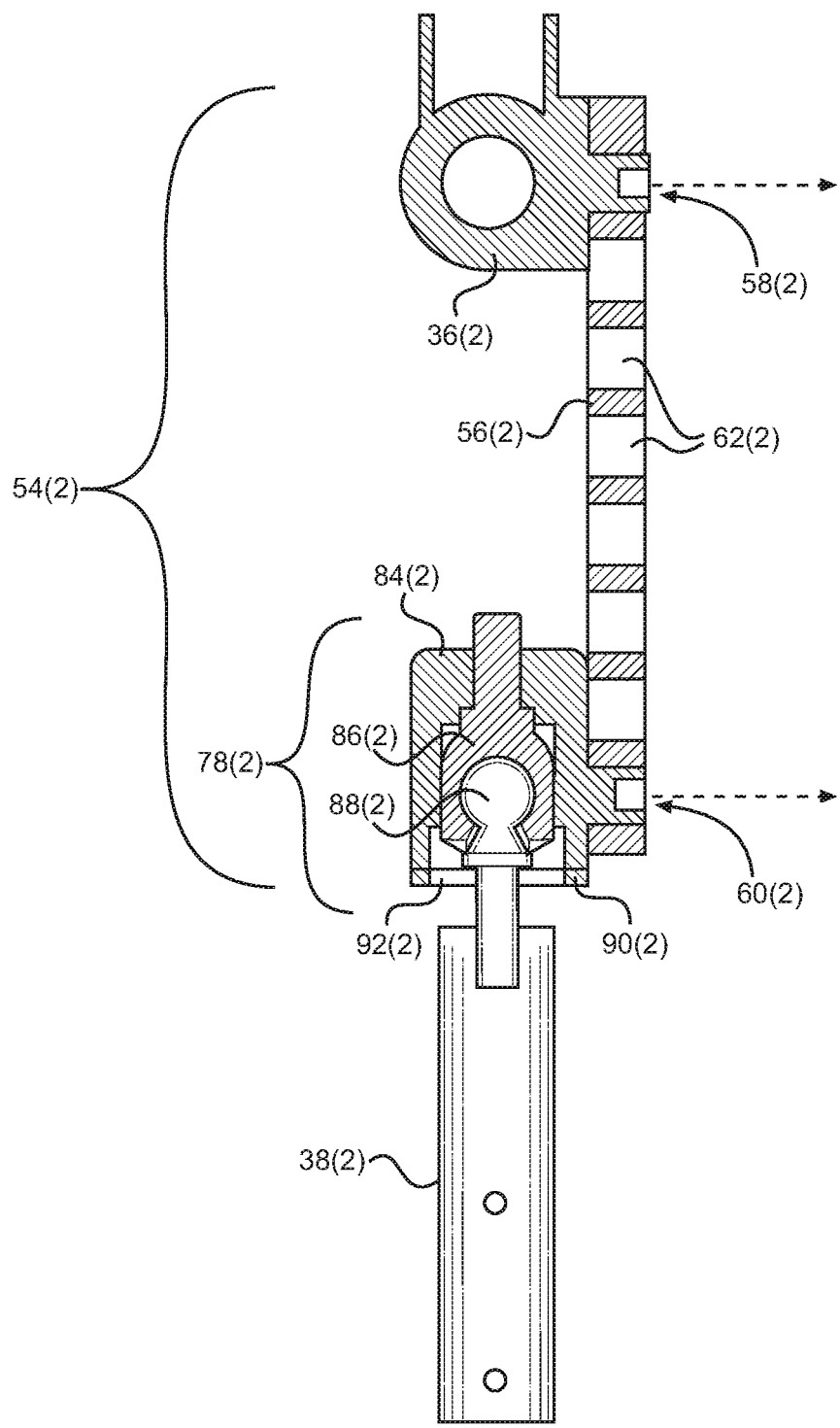
FIG. 5 is a cross-sectional diagram of the exoskeleton pelvic sub-assembly of FIG. 4, illustrating the component parts thereof.
Figure 6:
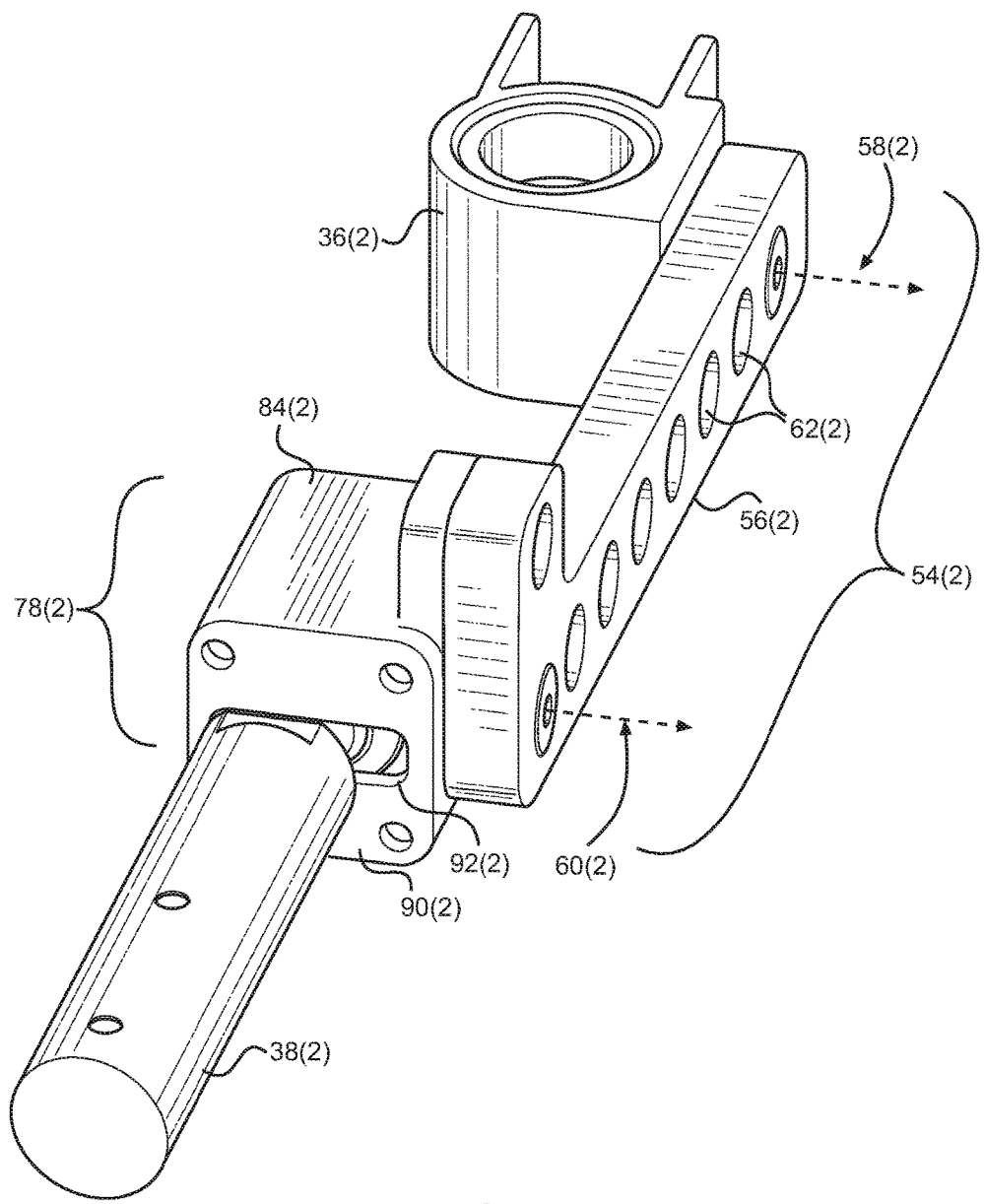
FIG. 6 is a detailed alternative isometric diagram of the exoskeleton pelvic sub-assembly of FIG. 4, illustrating additional components thereof.

Referring now to FIG. 4, a pelvic sub-assembly 54(2) according to an alternate embodiment is illustrated. In this embodiment, the thigh rotation joint 78(2) includes a ball joint mechanism 84(2) for allowing rotation of the thigh link 38(2) about the transverse plane 16 and the frontal plane 14. In this regard, FIG. 5 is a cross-sectional view of the pelvic sub-assembly 54(2) of FIG. 4, including the ball joint mechanism 84(2) of the thigh rotation joint 78(2). In this embodiment, an adjustable socket member 86(2) has a ball member 88(2) disposed therein, which is fixed to the thigh link 38(2). By adjusting the socket member 86(2) within the ball joint mechanism 84(2), the ball member 88(2) can be either fixed or rotatable with respect to the socket member 86(2), as desired. In this embodiment as well, the ball joint mechanism 84(2) also includes a ball joint restrictor plate 90(2) having a linear restrictor slot 92(2) therein. As shown in FIG. 6, the ball joint restrictor plate 90(2) permits rotation of the thigh link 38(2) in the transverse plane 16 and the frontal plane 14, but restricts rotation of the thigh link 38(2) in the sagittal plane 12. This allows the inguinal sagittal rotation axis 60(2) to be selectively converted between an unlocked configuration and a locked configuration.

Figure 7:
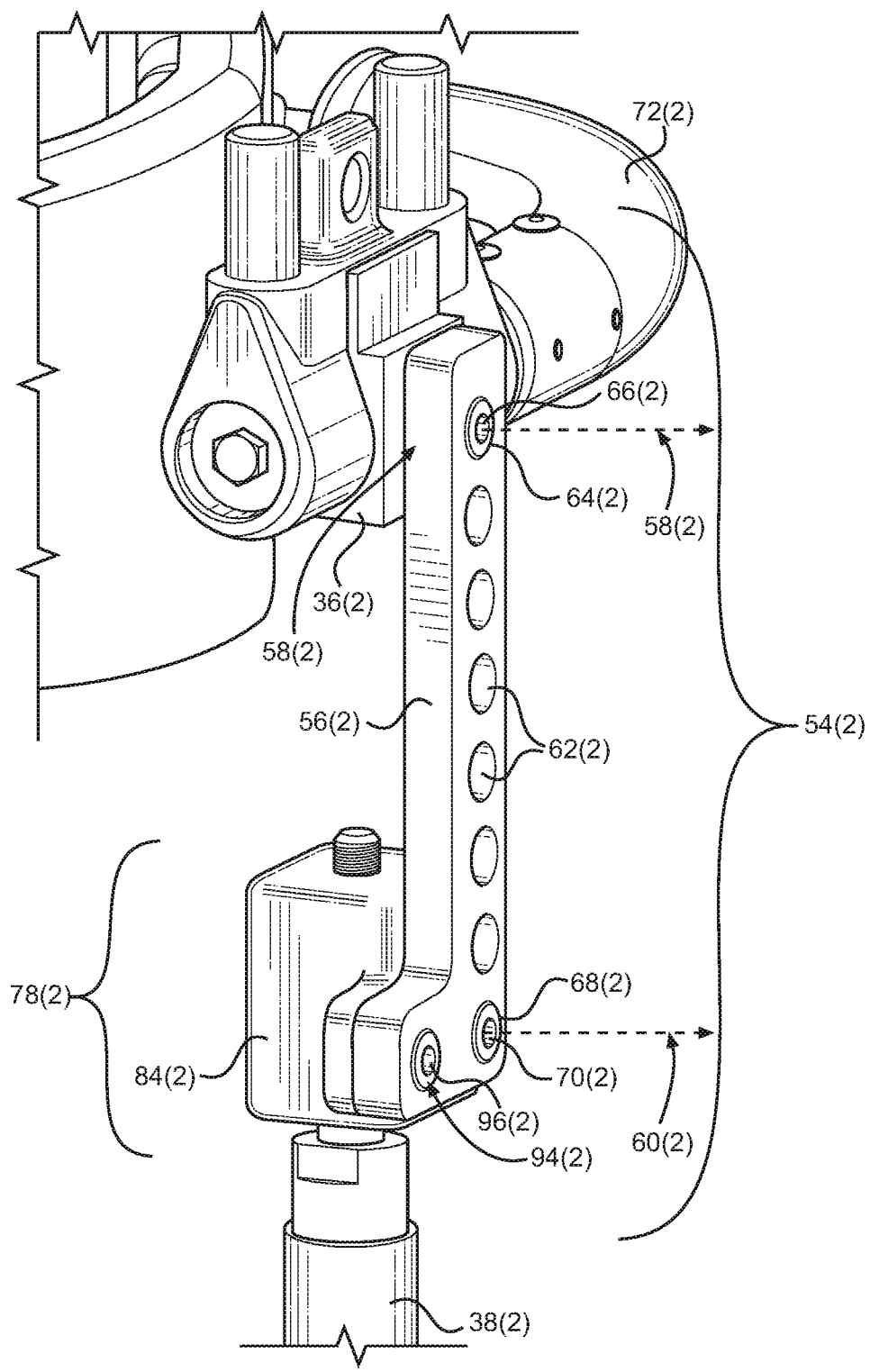
FIG. 7 is a detailed isometric diagram of the exoskeleton pelvic sub-assembly of FIG. 4, illustrating a locking mechanism for selectively locking the pelvic link.

In this regard, FIG. 7 illustrates a sagittal rotation lock mechanism 94(2) comprising a sagittal rotation lock fastener 96(2) for placing the inguinal sagittal rotation axis 60(2) in the locked configuration, thereby securing and preventing rotation of the thigh rotation joint 78(2) with respect to the pelvic link 56(2). In this embodiment, the locked configuration continues to permit the thigh link 38(2) to rotate with respect to the thigh rotation joint 78(2) in the transverse plane 16 and frontal plane 14. When in the unlocked configuration, the inguinal sagittal rotation axis 60(2) is free to rotate in the sagittal plane normally. In this manner, the inguinal sagittal rotation axis 60(2) can be selectively locked, for example to facilitate traditional exoskeleton movements, such as walking and/or carrying heavy loads using a passive, non-powered exoskeleton.

Figure 8:
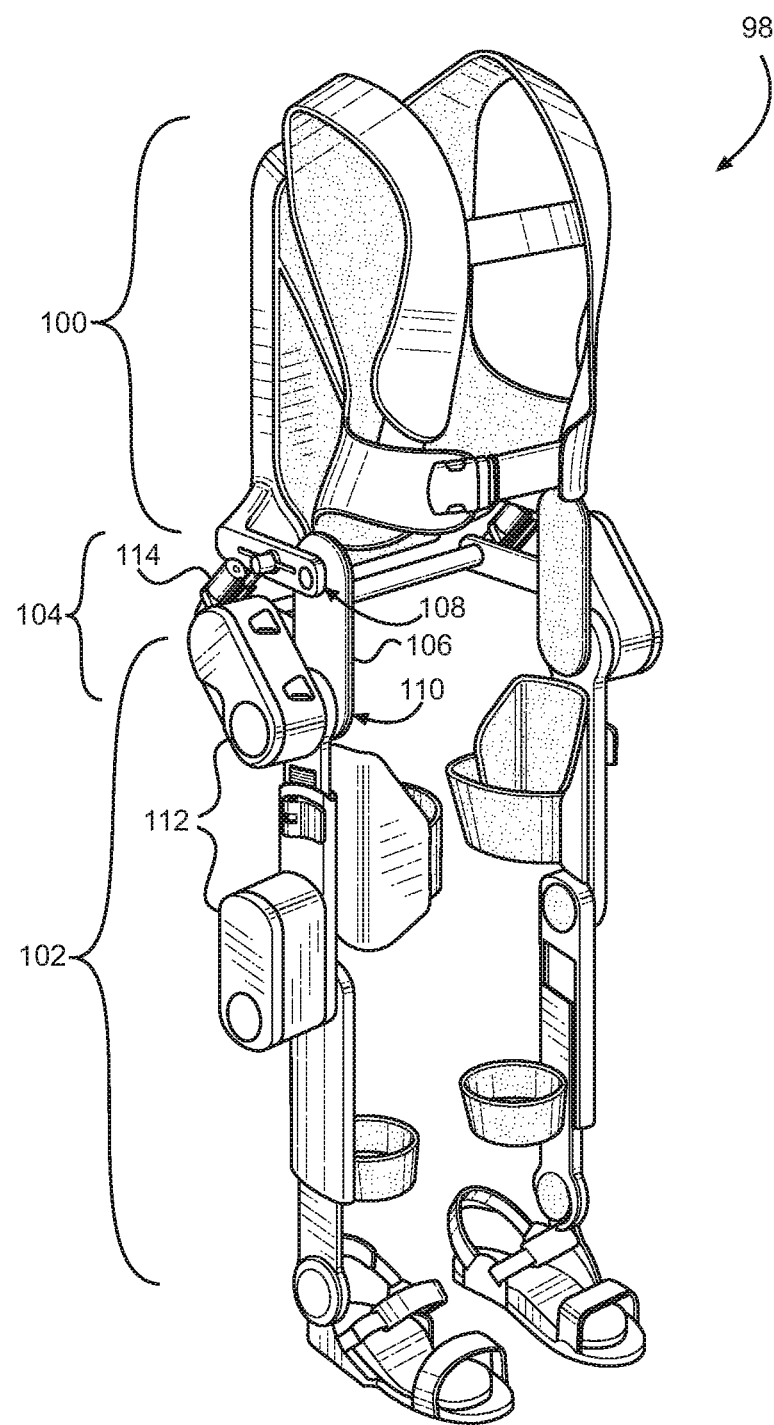
FIG. 8 is a detailed isometric diagram of an exoskeleton pelvic sub-assembly employing powered actuators for operating an exoskeleton pelvic sub-assembly, according to an alternate embodiment.

The exoskeleton 24 has been illustrated as a passive, non-powered exoskeleton, but the embodiments also have applicability to powered exoskeletons, including, for example, kinematic, force, electromyographic, and electroencephalographic control architectures. In this regard, FIG. 8 illustrates a powered exoskeleton 98 according to an alternate embodiment. In this embodiment, the powered exoskeleton 98 has an upper body exoskeleton 100 and a lower body exoskeleton 102 movably coupled to the upper body exoskeleton 100 with an exoskeleton pelvic sub-assembly 104 functionally similar to the pelvic sub-assembly 54, described above with respect to FIG. 3 et al. The exoskeleton pelvic sub-assembly 104 has a hip sagittal rotation axis 108 and an inguinal sagittal rotation axis 110. In this embodiment, the powered exoskeleton 98 also has a plurality of powered actuators 112 configured to power a plurality of rotation axes on the lower body exoskeleton 102, including the inguinal sagittal rotation axis 110. The powered exoskeleton 98 also has another plurality of powered actuators 114 configured to power rotation of the upper body exoskeleton 100 with respect to the exoskeleton pelvic sub-assembly 104 about the hip sagittal rotation axis 108.

Figure 9:
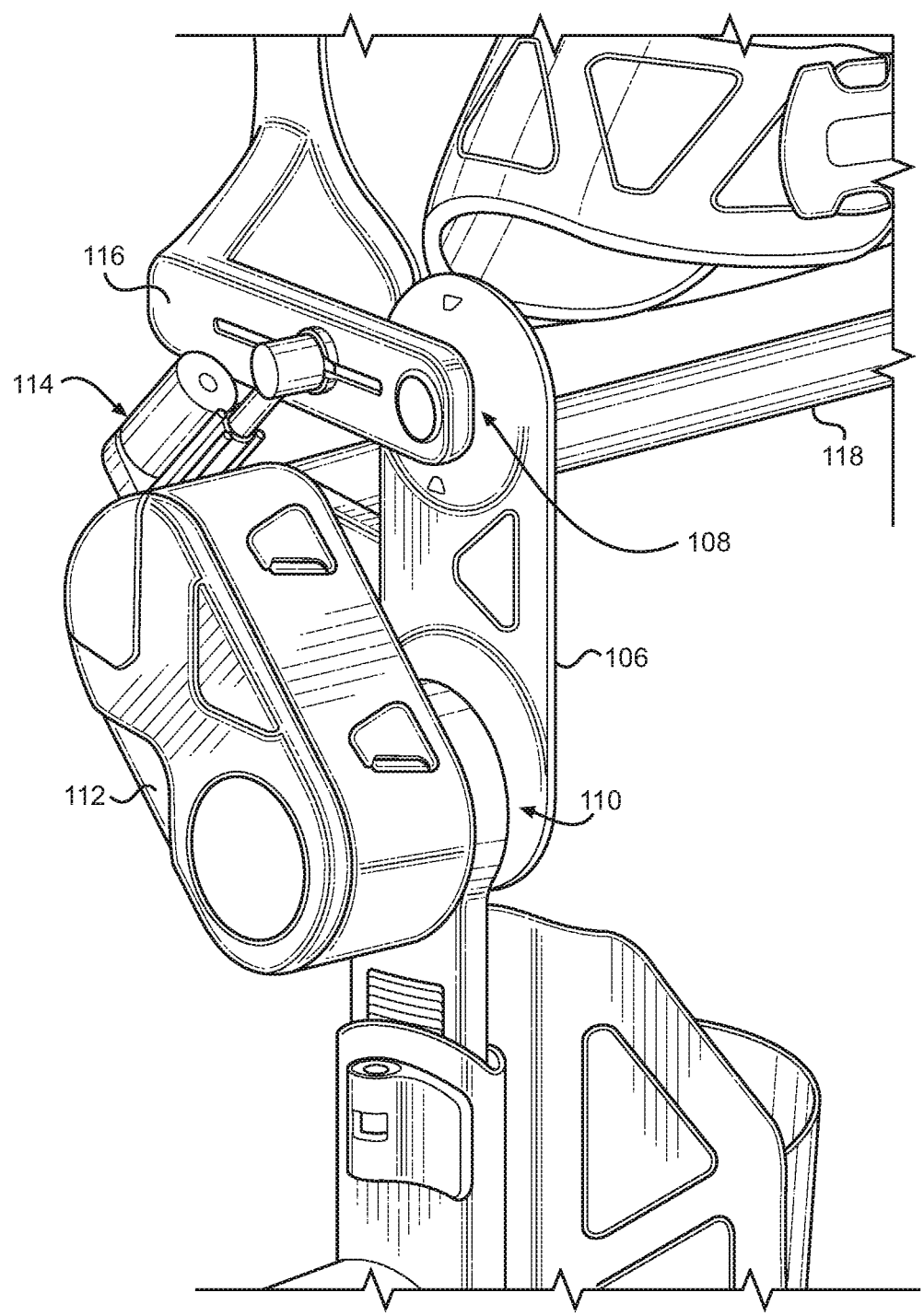
FIG. 9 is a detailed isometric diagram of the exoskeleton pelvic sub-assembly of FIG. 8, illustrating the component parts of the exoskeleton pelvic sub-assembly.

Referring now to FIG. 9, a detailed isometric view of the exoskeleton pelvic sub-assembly 104 of FIG. 8 is shown, illustrating the component parts of the exoskeleton pelvic sub-assembly 104. In this regard, a hip arc member 116 similar to hip arc member 72 of FIG. 3 et al. is fixed with respect to the upper body exoskeleton 100, and is rotatably coupled to each of the pelvic links 106 about the hip sagittal rotation axis 108. In this embodiment, a pelvic arc member 118, similar to the pelvic arc member 74(1) of FIG. 3 et al., is fixed with respect to each of the pelvic links 106, so that the pelvic links 106 rotate together with respect to the hip sagittal rotation axis 108.

In some embodiments, the powered actuators 112, 114 may comprise torque generators to induce rotation about the hip sagittal rotation axis 108, inguinal sagittal rotation axis 110, or other rotation axes. These torque generators may comprise passive mechanisms, such as springs or the like, or active mechanisms, such as pneumatic, hydraulic or electromechanical actuators. By selectively engaging a combination of powered actuators 112, 114, movement of different components of the powered exoskeleton 98 in the various rotational planes may be facilitated.

In some embodiments, however, it may be desirable for the pelvic links 106 to rotate about the hip sagittal rotation axis 108 independently of each other. In this regard, in some embodiments, the pelvic arc member 118 may be omitted, and the powered actuators 112, 114 may be configured to selectively rotate and/or fix the hip arc member 116, pelvic links 106, and/or other joints of the powered exoskeleton 98 with respect to each other. This may permit additional powered rotational movements in the various rotational planes that may be difficult to achieve with a passive exoskeleton system.

Figure 10:
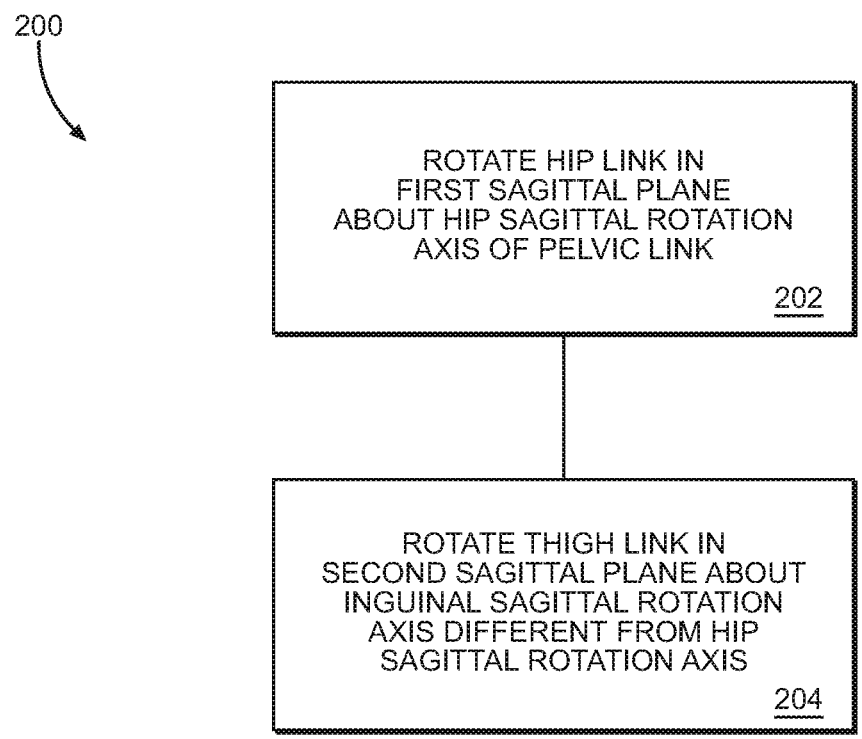
FIG. 10 is a flowchart diagram of a method of operating an exoskeleton according to an embodiment.

Referring now to FIG. 10, a flowchart of method 200 using an exoskeleton, such as the exoskeletons 24, 98 described above, is illustrated. The method 200 comprises rotating a hip link, such as hip link 36 for example, of the exoskeleton in a first sagittal plane about a hip sagittal rotation axis of a pelvic link, such as the hip sagittal rotation axis 58 of pelvic link 56 for example (Block 202). The method 200 further comprises rotating a thigh link, such as the thigh link 38 for example, of the exoskeleton in a second sagittal plane parallel to the first sagittal plane about an inguinal sagittal rotation axis of the pelvic link, such as the inguinal sagittal rotation axis 60 of the pelvic link 56 for example, wherein the inguinal sagittal rotation axis is different from the hip sagittal rotation axis (Block 204).

Those skilled in the art will recognize improvements and modifications to the preferred embodiments of the disclosure. All such improvements and modifications are considered within the scope of the concepts disclosed herein and the claims that follow.

What is claimed is:

1. An exoskeleton pelvic sub-assembly comprising:
a first pelvic link having a common hip sagittal rotation axis and a first inguinal sagittal rotation axis different from the common hip sagittal rotation axis;
a second pelvic link having the common hip sagittal rotation axis and a second inguinal sagittal rotation axis different from the common hip sagittal rotation axis;
a first hip joint coupled to the first pelvic link, the first hip joint configured to be coupled to a hip link and to allow sagittal plane rotation of the first pelvic link with respect to the hip link about the common hip sagittal rotation axis in response to movement by a user wearing the exoskeleton pelvic sub-assembly;
a second hip joint coupled to the second pelvic link, the second hip joint configured to be coupled to the hip link and to allow sagittal plane rotation of the second pelvic link with respect to the hip link about the common hip sagittal rotation axis in response to movement by a user wearing the exoskeleton pelvic sub-assembly;
a first inguinal joint coupled to the first pelvic link, the first inguinal joint configured to be coupled to a first thigh link and to allow sagittal plane rotation of the first pelvic link with respect to the first thigh link about the first inguinal sagittal rotation axis in response to the movement by the user;
a second inguinal joint coupled to the second pelvic link, the second inguinal joint configured to be coupled to a second thigh link and to allow sagittal plane rotation of the second pelvic link with respect to the second thigh link about the second inguinal sagittal rotation axis in response to the movement by the user; and
a rigid pelvic arc member fixed to the first pelvic link and the second pelvic link, the rigid pelvic arc member being configured to extend behind a body of the user and spaced a distance from a back of the body of the user to avoid contact with the back of the body of the user.

2. The exoskeleton pelvic sub-assembly of claim 1, wherein the first inguinal joint is further configured to allow frontal plane rotation and transverse plane rotation of the first thigh link with respect to the first pelvic link.

3. The exoskeleton pelvic sub-assembly of claim 1, wherein the first inguinal sagittal rotation axis and the common hip sagittal rotation axis are separated by a distance in a range of about 3 inches to about 6 inches.

4. The exoskeleton pelvic sub-assembly of claim 1, wherein one of the first inguinal sagittal rotation axis and the common hip sagittal rotation axis is movable between a plurality of positions on the first pelvic link.

5. The exoskeleton pelvic sub-assembly of claim 4, wherein, for each of the plurality of positions, the first inguinal sagittal rotation axis and the common hip sagittal rotation axis are separated by a distance in a range of about 3 inches to about 6 inches.

6. The exoskeleton pelvic sub-assembly of claim 1, wherein the exoskeleton pelvic sub-assembly further comprises a sagittal rotation lock mechanism having a locked configuration and an unlocked configuration, the sagittal rotation lock mechanism in the locked configuration preventing sagittal plane rotation of the first thigh link about the first inguinal sagittal rotation axis, and in the unlocked configuration permitting sagittal plane rotation of the first thigh link about the first inguinal sagittal rotation axis.

7. The exoskeleton pelvic sub-assembly of claim 1, wherein the first hip joint is configured to allow only sagittal plane rotation of the first pelvic link about the common hip sagittal rotation axis.

8. The exoskeleton pelvic sub-assembly of claim 1, wherein in a standing position, the first pelvic link extends in a direction that is perpendicular to a ground surface.

9. The exoskeleton pelvic sub-assembly of claim 1, wherein the rigid pelvic arc member is configured to cause the first pelvic link and the second pelvic link to rotate together about the common hip sagittal rotation axis.

10. The exoskeleton pelvic sub-assembly of claim 1, wherein the first pelvic link comprises a plurality of different connection locations positioned along a length of the first pelvic link, each of the plurality of different connection locations being connectable to the first hip joint at the common hip sagittal rotation axis via a fastening mechanism to adjust a distance between the first inguinal sagittal rotation axis and the common hip sagittal rotation axis.

11. An exoskeleton pelvic sub-assembly comprising:
a pair of pelvic links having a common hip sagittal rotation axis, each respective pelvic link of the pair of pelvic links having a corresponding inguinal sagittal rotation axis that is different from the common hip sagittal rotation axis;
a hip link comprising a first end configured to be located in proximity to a first side of a user and a second end configured to be located in proximity to a second side of a user;
a pair of hip joints, each hip joint of the pair of hip joints coupled to a corresponding different pelvic link of the pair of pelvic links, and configured to be coupled to the hip link and to allow sagittal plane rotation of the corresponding different pelvic link with respect to the hip link about the common hip sagittal rotation axis in response to movement by a user wearing the exoskeleton pelvic sub-assembly; and
a rigid pelvic arc member fixed to the pair of pelvic links, the rigid pelvic arc member being configured to extend behind a body of the user and spaced a distance from a back of the body of the user to avoid contact with the back of the body of the user.

* * * * *